(12) United States Patent
Gopalakrishnan et al.

(10) Patent No.: US 7,227,851 B1
(45) Date of Patent: Jun. 5, 2007

(54) TRANSPORT CHANNEL MULTIPLEXING SYSTEM AND METHOD

(75) Inventors: Nandu Gopalakrishnan, Chatham, NJ (US); Teck H. Hu, Budd Lake, NJ (US); Farooq Ullah Khan, Manalapan, NJ (US); Achilles George Kogiantis, Madison, NJ (US); Pantelis Monogioudis, Randolph, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 664 days.

(21) Appl. No.: 09/716,104

(22) Filed: Nov. 17, 2000

(51) Int. Cl.
*H04B 7/216* (2006.01)
(52) U.S. Cl. .................... 370/335; 370/537
(58) Field of Classification Search ............. 370/419, 370/420, 463, 335, 342, 314, 441, 442, 469, 370/470, 474, 476, 479, 537
See application file for complete search history.

(56) References Cited

U.S. PATENT DOCUMENTS 6,510,137 B1 * 1/2003 Belaiche .................. 370/232
6,624,767 B1 * 9/2003 Shiu et al. ................ 341/81
6,671,851 B1 * 12/2003 Moulsley .................. 714/790
2002/0015405 A1 * 2/2002 Sepponen et al. ........ 370/389

OTHER PUBLICATIONS

W0 00 27064 A (Lucent Technologies Inc.), May 11, 2000, abstract, p. 5, line 23—p. 10, line 14, figures 3, 4.
Eriksson et al: "comparison of link quality control strategies for packet data services in EDGE" Vehicular Technology Conference, 1999 IEEE 49th Houston, TX, USA May 16-20, 1999, Piscataway, NJ, USA, IEEE, US, May 16, 1999, pp. 938-942, XP010342128, ISBN: 0-7803-5565-2, section II.

* cited by examiner

*Primary Examiner*—Brian Nguyen

(57) ABSTRACT

A transport channel multiplexing system provides improved use of wireless resources in a shared data channel system. For example, the transport channel system reduces the amount of transport format information required for using a shared data channel, such as the actual number of packet data units in a transport channel of the shared data channel. Additionally, by scheduling or multiplexing coded sub-blocks from one or more transport channels over the shared data channel, the transport channel multiplexing system can provide improved integration with other important features, such as incremental redundancy, fast adaptation to channel conditions and transport channel dependent quality of service (QOS) control, to provide improved system performance.

3 Claims, 1 Drawing Sheet

TRANSPORT CHANNEL MULTIPLEXING SYSTEM AND METHOD

BACKGROUND OF THE INVENTION

1. Field of the Invention

This invention relates to wireless communications and, more particularly, to a transport channel multiplexing system that supports a downlink shared channel system.

2. Description of Related Art

Wireless communications systems include conventional cellular communication systems which comprise a number of cell sites or base stations, geographically distributed to support transmission and receipt of communication signals to and from wireless units which may actually be stationary or fixed. Each cell site handles voice communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless links or channels for a cellular communication system, including TDMA (time-division multiple access), FDMA (frequency-division multiple access), and CDMA (code-division multiple access) schemes. In CDMA communications, different wireless channels are distinguished by different codes or sequences that are used to spread different information streams, which may then be modulated at one or more different carrier frequencies for simultaneous transmission. A receiver can recover a particular information stream from a received signal using the appropriate code or sequence to decode the received signal.

Due to the delay-intolerant nature of voice communication, wireless units in conventional cellular systems transmit and receive over dedicated links between a wireless unit and a base station. Generally, each active wireless unit requires the assignment of a dedicated link on the forward link and a dedicated link on the reverse link. Traditional data applications are typically bursty and, unlike voice communications, relatively delay tolerant. As such, using dedicated links to transmit data is an inefficient use of network resources. Wireless communications systems are evolving that will support a variety of data services, such as wireless web browsing.

In the Universal Mobile Telecommunications System (UMTS), wireless units communicate with a base station over dedicated channels. To provide efficient wireless data communications, UMTS uses a downlink shared channel which can be shared by a plurality of wireless units to receive data. The downlink shared channel (DSCH) structure accepts information from a number of transport channels, that in general address different users, time multiplexes/schedules those into a single Coded Shared (or Scheduled) Transport Channel (CSTrCH). The CSTrCH is then mapped into a number of Physical Channels each corresponding to an Orthogonal Variable Spreading Factor (OVSF) code. To more efficiently use the downlink to carry data, it is advantageous to provide a transport channel multiplexing structure which enables more efficient use of wireless resources on the downlink.

SUMMARY OF THE INVENTION

The present invention is a transport channel multiplexing system which provides improved use of wireless resources in a shared data channel system. For example, the transport channel system reduces the amount of transport format information required for using a shared data channel, such as the actual number of packet data units in a transport channel of the shared data channel. Additionally, by scheduling or multiplexing coded sub-blocks from one or more transport channels over the shared data channel, the transport channel multiplexing system can provide improved integration with other important features, such as incremental redundancy, fast adaptation to channel conditions and transport channel dependent quality of service (QOS) control, to provide improved system performance.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
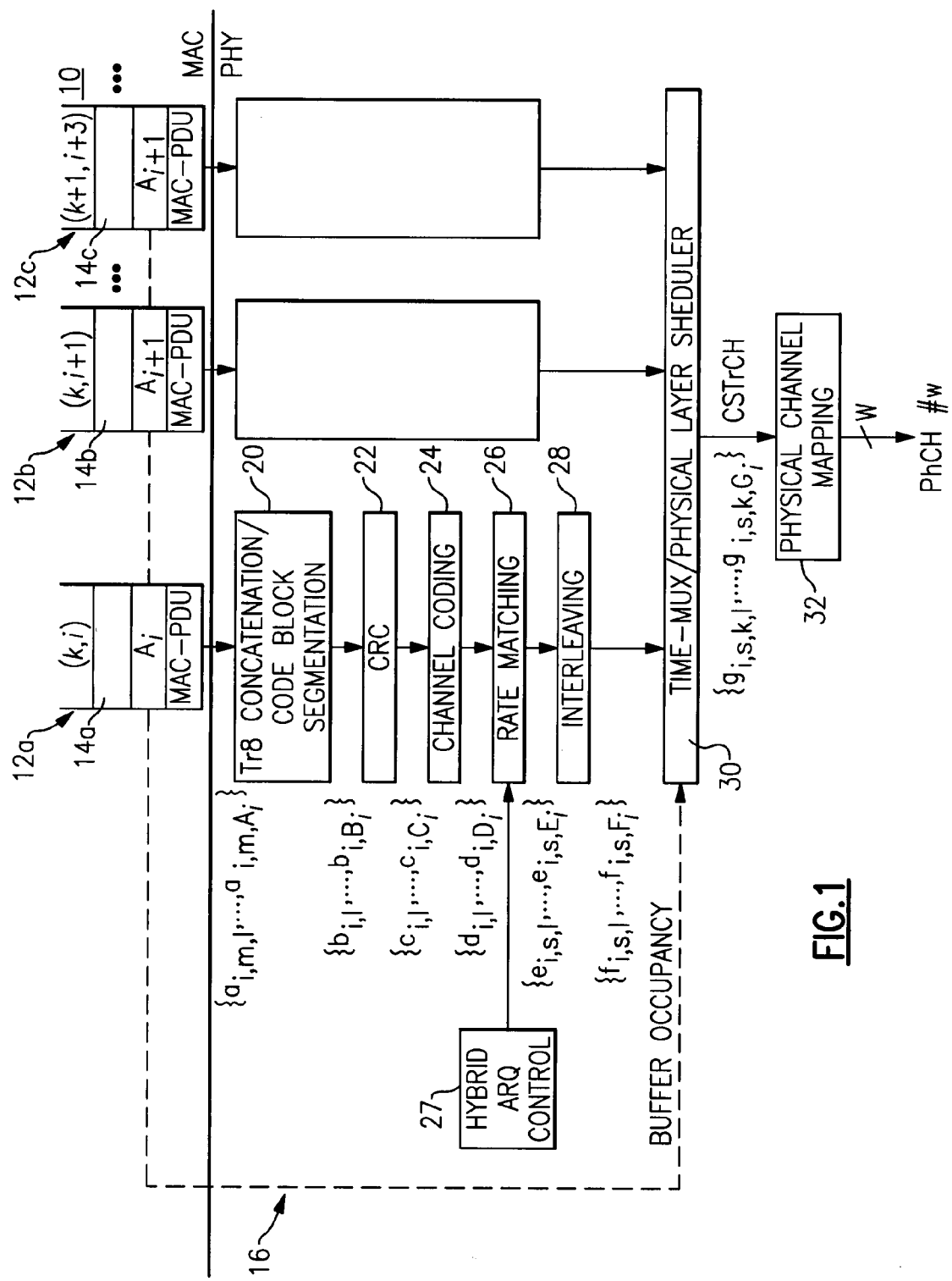
FIG. 1 shows a general diagram of an embodiment of the transport channel multiplexing system according to principles of the present invention.

Illustrative embodiments of the transport channel multiplexing system are described with respect to a system using a downlink shared channel for packet data communications. For example, a UMTS system has a downlink shared channel which is defined by at least one and more likely a plurality of channelization codes. The downlink shared channel is time division multiplexed, being divided into 10 millisecond frames of 15 slots of 0.667 milliseconds. In certain embodiments, the wireless units provide rate and antenna feedback from which the base station decides whether to provide the wireless unit with packet data access to the downlink shared channel. The downlink shared channel is comprised of a number of transport channels, and the transport channel multiplex structure maps or multiplexes the transport channel onto a Coded Shared Transport Channel which in turn is multiplexed or mapped into a physical downlink shared channel for transmission to the wireless units.

The transport channel multiplexing system reduces elements, such as certain transport format information (such as the actual number of PDUs M waiting to be sent over the transport channel), previously required for transmitting over the shared data channel. The system is efficient in that it does not attempt to precisely accommodate all possible transport channel combinations each having widely separate delay-throughput requirements. The system handles groups of transport channels configured in a similar fashion to be multiplexed into a physical downlink shared channel (PD-SCH). Additionally, the transport channel multiplex system in particularly well suited to increase the efficiency of packet data for shared channels using such features as Incremental Redundancy (IR), and Fast Cell-site Selection (FCS).

FIG. 1 shows an embodiment of a transport channel multiplexing system 10 in which downlink shared channel structure accepts information from a number of transport channels 12a–c. The radio resource control (RRC) layer determines the transport channel (TrCH) IDs (index i) that are going to be multiplexed in the transport channel multiplexer 10 for the downlink shared channel. Each transport channel 12a–c is shown with a buffer 14a–c to buffer the medium access control (MAC) layer packet data units (MAC-PDUs). The transport channel i (12a) injects into the physical layer multiplex structure 16 information formatted in MAC-PDU units.

Each MAC PDU consists of A(i) bits, for example 382 bits, and is represented as $\{a_{i,m,1}, \ldots, a_{i,m,A_i}\}$. The index m, identifies one of the M MAC-PDUs, where an example M is 8, that are injected into the physical layer to be transmitted within a Transmission Time Interval (TTI) that is given by, $$TTI = n \cdot T_{slot} \quad (0.1)$$

where n depends on physical layer scheduling, hybrid automatic repeat request (ARQ) state and rate information provided by the wireless unit.

In the current multiplexing structure, the presence of multiple transport channels into the physical layer and the multitude of configuration possibilities, mandate explicit Transport Format Combination Indication signaling to the wireless unit.

In HSDPA (high speed downlink packet access) though, it is the wireless unit that sends via the UL DPCCH channel's rate and antenna information (RAI) field, the required Rate Information (RI) to the base station. In this respect, the transport format combination indication (TFCI) signaling can be significantly reduced by mapping the RI and the transport channel (TrCH) identity (index i) scheduled by the Physical Layer Scheduler (PLS) entity, into the number of PDUs that are transmitted to the wireless unit, i.e.

$$M = \mu(RI, i). \quad (0.2)$$

where the function $\mu(.)$ is known to both the base station and the wireless unit. The only information that is required by the wireless unit to allow the downlink shared channel (DSCH) demultiplexing, is the TrCH id, as in general more than one TrCH are time multiplexed by the PLS. At any instant in time only one TrCH will be transmitted to one of the wireless units.

The wireless unit upon decoding the TrCH id, can determine the number M of PDUs and can de-multiplex the DSCH channel. Inefficiencies though may arise in the following scenario: when the channel conditions are favorable, the wireless unit indicates a Rate Information that corresponds to an $M \gg M_{actual}$ where $M_{actual}$ is the number of PDUs that are actually waiting in the base station buffer 14a. Consequently, another option would be the explicit signaling to the wireless unit of $M \epsilon \{M_{min}, \ldots, M_{max}\}$ in order to avoid excessive padding. $M_{min}$ and $M_{max}$ are communicated to the wireless via higher layer signaling.

In the embodiment of FIG. 1, a transport block concatenation/code block segmentation block 20 receives a number of PDUs from the buffer 14a and concatenates a number of PDUs or transport blocks into a transport block set and segments the transport block set into code block segments each having a number of PDUs. After the concatenation of the M Transport Blocks and Code Block segmentation, a CRC block 22 appends a CRC code to each Code Block Segment (CBS) of B(i) bits, for example M*A(i), rather than after each PDU, thereby reducing the number of bits required and resulting in a block of $$C(i) = B(i) + CRC(i) \quad (0.3)$$

bits that is encoded by a channel coder 24, such as a Turbo or Convolutional encoder, with nominal code rate r. For example, a channel coder with a code rate of 1/5 to produce a coded block of D(i)=5*C(i) bits, where an example of C(i) equals 3072 bits, which adds redundancy.

The resulting D(i) bits are provided to a rate matching block 26 which punctures the code block to a code rate $r^*(i, RI) > r$ that is a deterministic function of the decoded Rate Information (RI) in this embodiment. For example, the code block is punctured to into a number of coded sub-blocks, for example four (4), each corresponding to a unique puncturing pattern for that sub-block. A sub-block (denoted by the index s) is defined as a rate-matched block of size E(i) bits, for example 3840 bits. Depending on the NACK/ACK feedback described below, a new sub-block or a continue sub-block of the transport channel i is submitted, as controlled by ARQ block 27, to a block interleaver 28 and finally to the Time-Multiplexer or Physical Layer Scheduler (PLS) entity 30 where it is scheduled for transmission.

In accordance with a principle of the transport channel multiplexing structure, a coded sub-block of the code block is provided to the scheduler 30 for transmission for the transport channel i (12a) and can be used to perform incremental redundancy at the coded sub-block level. For example, the wireless unit sends via the uplink dedicated physical control channel, positive (ACK) or negative (NACK) acknowledgment of the received sub-block. Initially, the first sub-block is sent. If a negative acknowledgement (NACK) is sent back from the wireless unit, then the base station sends another sub-block as controlled by the ARQ 27. If a NACK is sent back again, the base station sends the next sub-block and so on until the base station sends all the coded sub-blocks for a corresponding code block. As such, incremental redundancy is implemented in that the code rate $r^*$ is gradually decreased with every retransmission. The base station will keep on sending the coded sub-blocks in a round-robin fashion until a number of retransmissions is reached. This number is a system parameter. If this number is reached without an ACK, the base station will inform the upper layers.

Additionally, by sending coded sub-blocks from different transport channels 12a–c with potentially different quality of service (QOS) requirements to be scheduled for transmission by the scheduler 30, the transport channel multiplexing system 10 enables quality of service control and adaptation to time-varying channel conditions that effect the wireless units multiplexed into the downlink shared channel.

In the embodiment of FIG. 1, The scheduler 30 schedules the sub-blocks based on the QoS and the priority that has been allocated to each transport channel. After the sub-block is scheduled for transmission, the sub-block is mapped or multiplexed into the Coded Shared Transport Channel. The mapping from CSTrCH to a number of physical channels is performed at the physical channel mapping block 32 using the number of W-ary OVSF codes (W is a system constant) that are available at the point of time of the actual transmission In addition to the embodiment(s) described above, the transport channel multiplexing system has been described for use in a UMTS system where the data channel is a shared, time division multiplexed channel made up of at least one channelization code. The transport channel multiplexing system according to the principles of the present invention can be used with different cellular systems and uplink and/or downlink configurations which omit and/or add components and/or use variations or portions of the described system.

It should be understood that the system and portions thereof and of the described transport channel multiplexing system can be implemented in different locations, such as the wireless unit, the base station, a base station controller and/or mobile switching center. Moreover, logic or hardware required to implement and use the transport channel multiplexing system structure can be implemented in application specific integrated circuits, software-driven processing circuitry, firmware, programmable logic devices, hardware, discrete components or arrangements of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method comprising the steps of:

receiving packet data units in a buffer;

concatenating a plurality of packet data units to produce a transport block set;

coding said transport block set to a coded block;

rate matching said coded block to form coded sub-blocks and coded sub-block being subject to additional processing;

time-multiplexing the rate-matched coded sub-blocks into a coded shared transport channel; and mapping a plurality of transport format combination indication signaling information into a number of packet data units transmitted to a wireless unit in association with the coded shared transport channel.

2. The method of claim 1 comprising:

interleaving at least said coded sub-block.

3. The method of claim 1, wherein the plurality of transport format combination indication signaling information comprises rate information and transport channel identity.

* * * * *